(12) United States Patent
Li (10) Patent No.: US 12,253,275 B2
(45) Date of Patent: Mar. 18, 2025

(54) AIR CONDITIONING SYSTEM AND CONTROL METHOD AND DEVICE THEREOF FOR CONTROLLING OPERATION BASED ON GAS CONCENTRATION OF CARBON DIOXIDE AND HUMIDITY

(71) Applicants: GD MIDEA AIR-CONDITIONING EQUIPMENT CO., LTD., Foshan (CN); MIDEA GROUP CO., LTD., Foshan (CN)

(72) Inventor: Si Li, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 489 days.

(21) Appl. No.: 17/639,393

(22) PCT Filed: Sep. 29, 2019

(86) PCT No.: PCT/CN2019/109053
§ 371 (c)(1),
(2) Date: Mar. 1, 2022

(87) PCT Pub. No.: WO2021/042436
PCT Pub. Date: Mar. 11, 2021

(65) Prior Publication Data
US 2022/0316743 A1   Oct. 6, 2022

(30) Foreign Application Priority Data
Sep. 4, 2019 (CN) .......................... 201910831233.9

(51) Int. Cl.
*F24F 11/65* (2018.01)
*F24F 11/72* (2018.01)
*F24F 110/70* (2018.01)

(52) U.S. Cl.
CPC .............. *F24F 11/65* (2018.01); *F24F 11/72* (2018.01); *F24F 2110/70* (2018.01)

(58) Field of Classification Search
CPC ...................................................... F24F 11/65
See application file for complete search history.

(56) References Cited

U.S. PATENT DOCUMENTS 6,021,953 A     2/2000  Swan
2012/0173026 A1* 7/2012  Colby .................... G05B 15/02
                                                    702/45

(Continued)

FOREIGN PATENT DOCUMENTS

CN     101245936 A     8/2008
CN     102287900 A    12/2011

(Continued)

OTHER PUBLICATIONS

World Intellectual Property Organization (WIPO) International Search Report and Written Opinion for PCT/CN2019/109053 May 28, 2020 21 Pages (with translation).

(Continued)

*Primary Examiner* — Nathan L Laughlin
(74) *Attorney, Agent, or Firm* — Anova Law Group, PLLC (57) ABSTRACT

A control method for an air conditioning system includes acquiring a gas concentration of indoor carbon dioxide, determining an operation state of a fresh air mode according to the gas concentration, acquiring an indoor humidity of an indoor environment and an outdoor humidity, determining an operation state of a dehumidification mode according to (Continued)

S101: acquiring a gas concentration of indoor carbon dioxide, determining an operation state of a fresh air mode according to the gas concentration, and controlling the air conditioning system to operate according to the operation state of the fresh air mode S102: acquiring a first humidity of an indoor environment and an outdoor humidity, determining an operation state of a dehumidification mode according to the first humidity and the outdoor humidity, and controlling the air conditioning system to operate according to the operation state of the dehumidification mode the indoor humidity and the outdoor humidity, and controlling the air conditioning system to operate according to at least one of the operation state of the fresh air mode or the operation state of the dehumidification mode.

15 Claims, 5 Drawing Sheets

(56) References Cited

U.S. PATENT DOCUMENTS

| | | | | |
|---|---|---|---|---|
| 2016/0354722 | A1* | 12/2016 | Yamamoto | B01D 53/0454 |
| 2017/0108231 | A1* | 4/2017 | Hasegawa | F24F 3/147 |
| 2019/0338974 | A1* | 11/2019 | Turney | F24F 11/47 |
| 2020/0056424 | A1* | 2/2020 | Farnes | E06B 7/10 |

FOREIGN PATENT DOCUMENTS

| | | |
|---|---|---|
| CN | 102721133 A | 10/2012 |
| CN | 104296272 A | 1/2015 |
| CN | 105674513 A | 6/2016 |
| CN | 205980031 U | 2/2017 |
| CN | 107120804 A | 9/2017 |
| CN | 107560087 A | 1/2018 |
| CN | 108413580 A | 8/2018 |
| JP | H11287538 A | 10/1999 |

OTHER PUBLICATIONS

The China National Intellectual Property Administration (CNIPA) The First Office Action for Chinese Application No. 201910831233.9 Jul. 20, 2021 18 Pages (With Translation).

The China National Intellectual Property Administration (CNIPA) The Second Office Action for Chinese Application No. 201910831233.9 Jan. 28, 2022 9 Pages (With Translation).

* cited by examiner

AIR CONDITIONING SYSTEM AND CONTROL METHOD AND DEVICE THEREOF FOR CONTROLLING OPERATION BASED ON GAS CONCENTRATION OF CARBON DIOXIDE AND HUMIDITY

CROSS-REFERENCE TO RELATED APPLICATION APPLICATIONS

This application is a National Stage Entry under 35 U.S.C. § 371 of International Application No. PCT/CN2019/109053, filed on Sep. 29, 2019, which claims priority to Chinese Patent Application No. 201910831233.9 filed on Sep. 4, 2019 in the name of "air conditioning system and control method and device thereof" by GD Midea Air-Conditioning Equipment Co., Ltd. and Midea Group Co., Ltd., the entire contents of both of which are incorporated herein by reference.

FIELD

The present disclosure relates to the technical field of air conditioners, and more particularly, to an air conditioning system, a control method for an air conditioning system and a control device of an air conditioning system.

BACKGROUND

With the development of science and technology and the increasing improvement of living standards, the requirements on the living environment are gradually increasing. Air conditioners play a very important role in improving the living air environment. Research has indicated that when having been in a closed air-conditioning environment for a long time, people may experience drowsiness, hypoxia and even shock due to the decrease of oxygen content. However, considering the quality and temperature of the outdoor air, users are often reluctant to open windows for ventilation to prevent further deterioration of the indoor air.

SUMMARY

The present disclosure at least solves one of technical problems existing in the related art.

Accordingly, a first object of the present disclosure is to provide a control method for an air conditioning system, so as to automatically control a fresh air mode and a dehumidification mode of the air conditioning system.

A second object of the present disclosure is to provide a control device of an air conditioning system.

A third object of the present disclosure is to provide an air conditioning system.

A fourth object of the present disclosure is to provide a computer readable storage medium.

To achieve the above objects, a first aspect of the present disclosure provides a control method for an air conditioning system. The air conditioning system includes a first heat exchanger connected in parallel to an indoor heat exchanger. The method includes:
  acquiring a gas concentration of indoor carbon dioxide, determining an operation state of a fresh air mode according to the gas concentration, and controlling the air conditioning system to operate according to the operation state of the fresh air mode;
  acquiring a first humidity of an indoor environment and an outdoor humidity, determining an operation state of a dehumidification mode according to the first humidity and the outdoor humidity, and controlling the air conditioning system to operate according to the operation state of the dehumidification mode.

Acquiring a gas concentration of indoor carbon dioxide and determining an operation state of a fresh air mode according to the gas concentration include:
  acquiring a change rate of the gas concentration according to the gas concentration;
  detecting and identifying that the change rate of the gas concentration is greater than a preset change rate, and controlling the fresh air mode to be in an on-state,
  or detecting and identifying that the change rate of the gas concentration is less than or equal to a preset change rate and a change curve of the gas concentration is the same as a preset change curve, and controlling the fresh air mode to be in an off-state.

Acquiring a first humidity of an indoor environment and an outdoor humidity and determining an operation state of a dehumidification mode according to the first humidity and the outdoor humidity include:
  acquiring a humidity difference value between the first humidity and the outdoor humidity;
  detecting and identifying that the humidity difference value is greater than or equal to a preset humidity difference value, and controlling the dehumidification mode to be in an on-state;
  detecting and identifying that the humidity difference value is less than a preset humidity difference value, and controlling the dehumidification mode to be in an off-state.

Controlling the air conditioning system to operate according to an on-state of the fresh air mode includes:
  acquiring a first temperature of an indoor environment and a second temperature at an air outlet of the first heat exchanger;
  acquiring a first temperature difference value between the first temperature and the second temperature;
  identifying that the first temperature difference value is greater than a first preset temperature difference value, and controlling a compressor to increase an operation frequency;
  identifying that the first temperature difference value is less than the first preset temperature difference value, and controlling the first heat exchanger to reduce a motor speed.

In the case of identifying that the first temperature difference value is greater than the first preset temperature difference value and controlling the compressor to increase the operation frequency, the method further includes:
  acquiring the first humidity and a second humidity at the air outlet of the first heat exchanger;
  acquiring a second humidity difference value between the first humidity and the second humidity;
  identifying that the second humidity difference value is greater than a second preset humidity difference value, and controlling an opening degree of an electronic expansion valve at an inlet of the first heat exchanger to decrease.

Controlling the air conditioning system to operate according to both an on-state of the fresh air mode and an on-state of the dehumidification mode includes:
  acquiring a third temperature at an air outlet of an indoor heat exchanger and a second temperature at an air outlet of the first heat exchanger;
  acquiring a third temperature difference value between the second temperature and the third temperature;

identifying that the third temperature difference value is less than a third preset temperature difference value, and controlling the first heat exchanger to reduce a motor speed.

In the case of controlling the first heat exchanger to reduce a motor speed, the method further includes:

acquiring a third humidity at the air outlet of the indoor heat exchanger and a second humidity at the air outlet of the first heat exchanger;

acquiring a fourth humidity difference value between the second humidity and the third humidity;

identifying that the fourth humidity difference value is less than a fourth preset humidity difference value, and controlling an opening degree of an electronic expansion valve at an inlet of the first heat exchanger to increase.

The method further includes:

acquiring a third humidity at the air outlet of the indoor heat exchanger and a second humidity at the air outlet of the first heat exchanger;

acquiring a fourth humidity difference value between the second humidity and the third humidity;

identifying that the third temperature difference value is greater than the third preset temperature difference value and the fourth humidity difference value is greater than a fourth preset humidity difference value, and controlling an opening degree of an electronic expansion valve at an inlet of the first heat exchanger to decrease, identifying that the third temperature difference value is greater than the third preset temperature difference value and the fourth humidity difference value is less than a fourth preset humidity difference value, and controlling an opening degree of an electronic expansion valve at an inlet of the first heat exchanger to increase.

According to the control method for the air conditioning system of the present disclosure, while the fresh air mode and the dehumidification mode of the air conditioning system are automatically controlled, the humidity and the temperature of the fresh air can be balanced, so as to prevent the temperature from being too low during the dehumidification process, thereby avoiding adversely affecting the indoor temperature and causing uncomfortable feeling to user; or so as to avoid the situation where the temperature is increased but the dehumidification effect is not good, thereby improving the comfort level of user.

To achieve the above objects, a second aspect of the present disclosure provides a control device of an air conditioning system. The device includes:

an identification module, configured to:

acquire a gas concentration of indoor carbon dioxide, determine an operation state of a fresh air mode according to the gas concentration, acquire a first humidity of an indoor environment and an outdoor humidity, and determine an operation state of a dehumidification mode according to the first humidity and the outdoor humidity; and a control module, configured to:

control the air conditioning system to operate according to the operation state of the fresh air mode, and control the air conditioning system to operate according to the operation state of the dehumidification mode.

To achieve the above objects, a third aspect of the present disclosure provides an air conditioning system including the control device as described in the foregoing embodiments.

To achieve the above objects, a fourth aspect of the present disclosure provides a computer readable storage medium, having stored therein a computer program that, when executed by a processor, a control method for an air conditioning system as described in the foregoing embodiments is implemented.

Additional aspects and advantages of the present disclosure will be set forth, in part, in the following description, and in part will be apparent from the following description or learned by practice of the present disclosure.

DESCRIPTION OF DRAWINGS

The above and/or additional aspects and advantages of the present disclosure will become apparent and readily understood from the following description of embodiments in combination with the drawings, in which.

REFERENCE NUMBERS

Compressor 1, outdoor heat exchanger 2, first throttle valve 3, indoor heat exchanger 4, second cut-off valve 5, electronic expansion valve 6, first heat exchanger 7, third cut-off valve 8, fourth cut-off valve 9.

DETAILED DESCRIPTION OF EMBODIMENTS

Embodiments of the present disclosure are described below in detail and examples of the embodiments are illustrated in the drawings. The same or similar elements and the elements having same or similar functions are denoted by like reference numerals throughout the descriptions. The embodiments described herein with reference to drawings are illustrative and used to explain the present disclosure. The embodiments shall not be construed to limit the present disclosure.

An air conditioning system, a control method for an air conditioning system and a control device of an air conditioning system are described with reference to the drawings.

Figure 1:
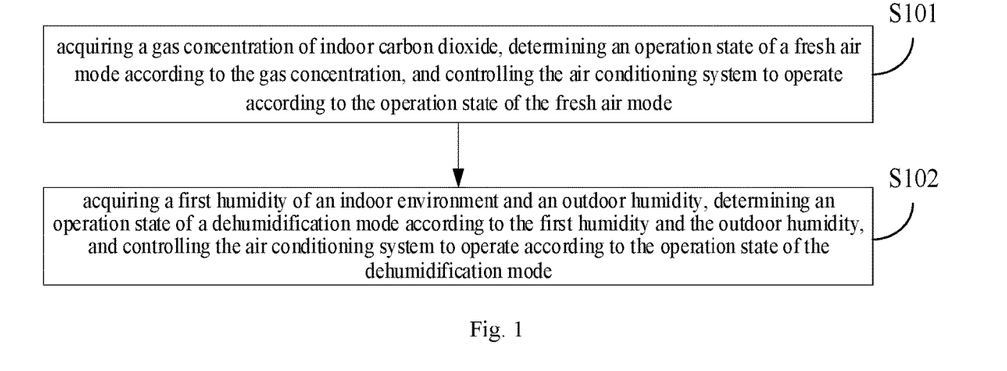
FIG. 1 is a flow chart of a control method for an air conditioning system according to an embodiment of the present disclosure.

FIG. 1 is a flow chart of a control method for an air conditioning system according to an embodiment of the present disclosure.

Figure 2:
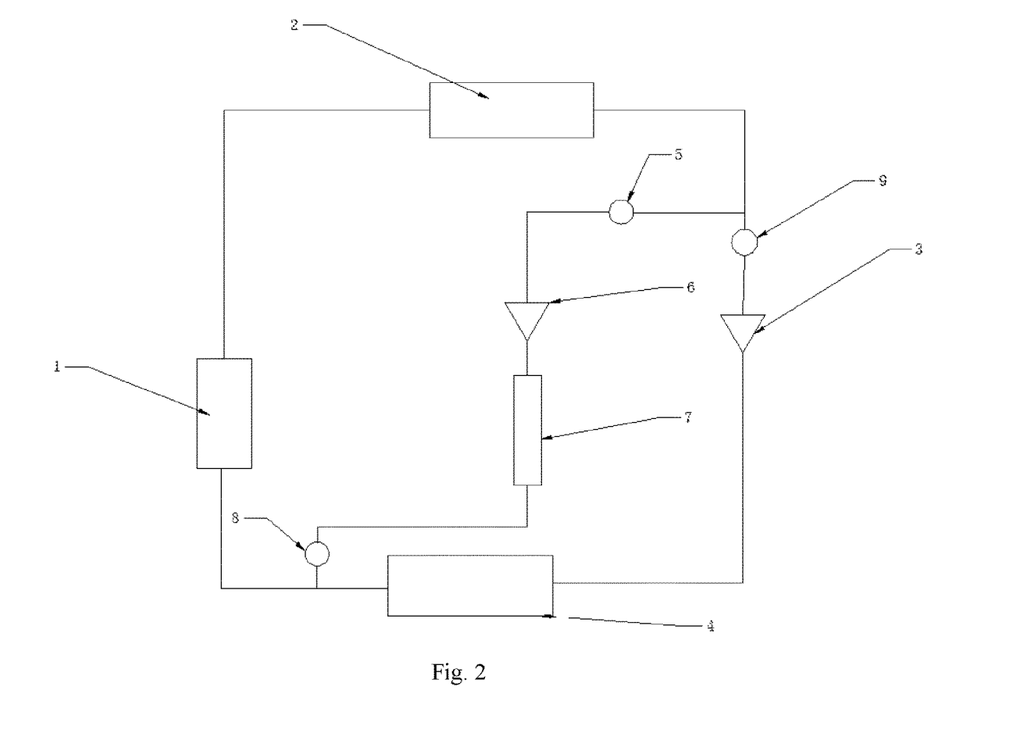
FIG. 2 is a schematic diagram of an air conditioning system according to an embodiment of the present disclosure.

As shown in FIG. 2, the air conditioning system of the present disclosure includes a fresh air circuit including a compressor, an outdoor heat exchanger and an indoor heat exchanger, and a dehumidification circuit including a compressor, an outdoor heat exchanger and a first heat exchanger. The first heat exchanger is connected in parallel to the indoor heat exchanger. Further, both ends of the first heat exchanger are provided with cut-off valves to control the on-state and the off-state of the dehumidification circuit. The inlet of the indoor heat exchanger is provided with a cut-off valve to control the on-state and the off-state of the fresh air circuit. It should be noted that, in the embodiments of the present disclosure, the outdoor heat exchanger is a condenser and the indoor heat exchanger is an evaporator, which are configured to adjust the temperature of the fresh air, that is, for refrigeration. The first heat exchanger is a dehumidification evaporator, which is configured to adjust the humidity of the fresh air, that is, for dehumidification. The fresh air after the refrigeration and/or the dehumidification by the indoor heat exchanger and/or the first heat exchanger is sent to the indoor environment to adjust the temperature and humidity in the room.

A shown in FIG. 1, the control method for an air conditioning system according to the present disclosure includes:

S101 acquiring a gas concentration of indoor carbon dioxide, determining an operation state of a fresh air mode according to the gas concentration, and controlling the air conditioning system to operate according to the operation state of the fresh air mode;

S102 acquiring a first humidity of an indoor environment and an outdoor humidity, determining an operation state of a dehumidification mode according to the first humidity and the outdoor humidity, and controlling the air conditioning system to operate according to the operation state of the dehumidification mode.

That is, the control method according to the present disclosure can automatically identify the operation state of the fresh air mode based on the gas concentration of indoor carbon dioxide, and automatically identify the operation state of the dehumidification mode based on the relationship between the indoor humidity and the outdoor humidity. It should be understood that when the conditions for starting the fresh air mode are met, the fresh air mode is automatically turned on; when the conditions for starting the dehumidification mode are met, the dehumidification mode is automatically turned on; and when the conditions for starting both the fresh air mode and the dehumidification mode are met, the fresh air mode and the dehumidification mode are both controlled to be in an on-state.

It should be noted that the gas concentration of indoor carbon dioxide and the humidity relationship as mentioned above are merely used to identify the fresh air mode and the dehumidification mode but are not used to control the fresh air mode and the dehumidification mode.

Figure 3:
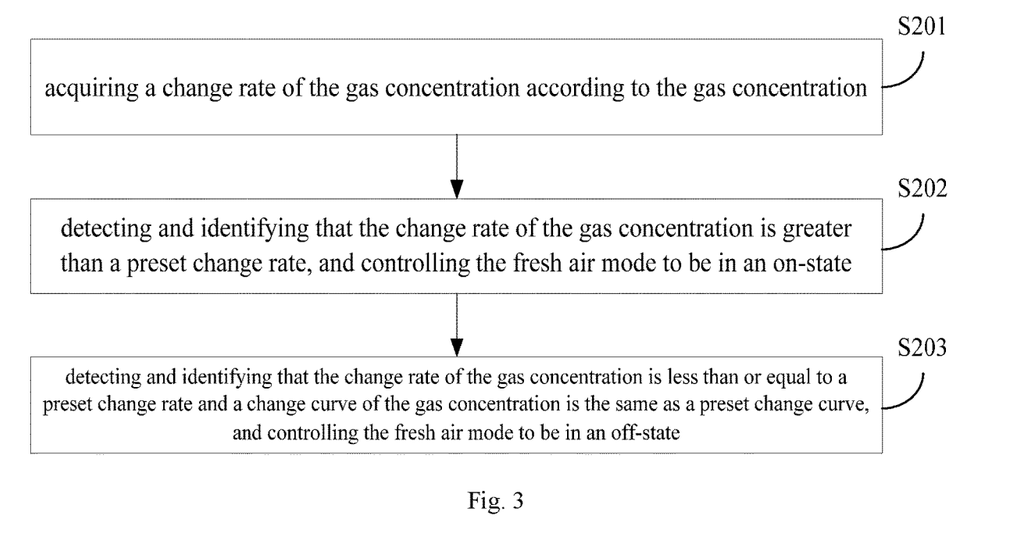
FIG. 3 is a flow chart of a control method for an air conditioning system according to an embodiment of the present disclosure.

A shown in FIG. 3, acquiring a gas concentration of indoor carbon dioxide and determining an operation state of a fresh air mode according to the gas concentration include:

S201 acquiring a change rate of the gas concentration according to the gas concentration;

S202 detecting and identifying that the change rate of the gas concentration is greater than a preset change rate, and controlling the fresh air mode to be in an on-state, S203 detecting and identifying that the change rate of the gas concentration is less than or equal to a preset change rate and a change curve of the gas concentration is the same as a preset change curve, and controlling the fresh air mode to be in an off-state.

That is, it is needed to acquire the gas concentration of indoor carbon dioxide in real time, draw a concentration curve of carbon dioxide, and calculate the change rate of the gas concentration according to the concentration curve of carbon dioxide, i.e., a ratio of carbon dioxide concentration to time. It is determined whether the change rate of the gas concentration is greater than a preset change rate. If the change rate of the gas concentration is greater than or equal to the preset change rate, it indicates that the indoor air quality is poor and tends to worsen, and thus it is needed to control the fresh air mode to be in the on-state to inject outdoor fresh air into the room. If the change rate of the gas concentration is less than or equal to the preset change rate and a change curve of the gas concentration is the same as a preset change curve, it indicates that the indoor air quality is within a normal change range and there is no need to inject fresh air into the room, and thus the fresh air mode is controlled to be in an off-state.

It should be understood that, because the air is a flowing state, situations like air flow fluctuation exist, the change curve of the gas concentration may be different from the preset change curve within a preset change range. That is, the change curve of the gas concentration can be similar to the preset change curve and does not need to be identical.

Therefore, the control method of the present disclosure can automatically control the fresh air mode to be in an on-state so as to adjust the air in the indoor environment, and automatically control the fresh air mode to be in an off-state so as to reduce the loss of energy efficiency.

Figure 4:
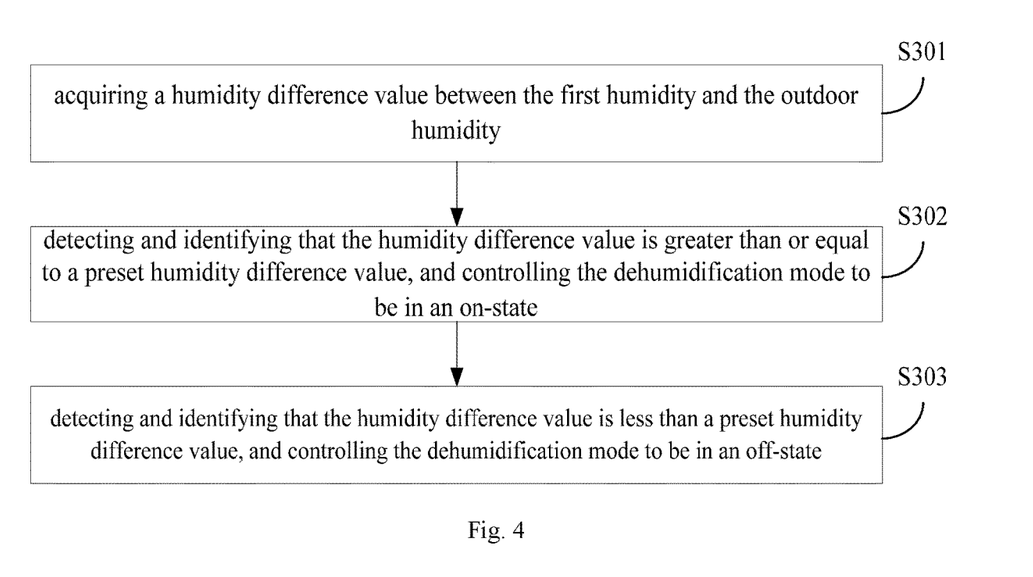
FIG. 4 is a flow chart of a control method for an air conditioning system according to another embodiment of the present disclosure.

A shown in FIG. 4, acquiring a first humidity of an indoor environment and an outdoor humidity and determining an operation state of a dehumidification mode according to the first humidity and the outdoor humidity include:

S301 acquiring a humidity difference value between the first humidity and the outdoor humidity;

S302 detecting and identifying that the humidity difference value is greater than or equal to a preset humidity difference value, and controlling the dehumidification mode to be in an on-state;

S303 detecting and identifying that the humidity difference value is less than a preset humidity difference value, and controlling the dehumidification mode to be in an off-state.

That is, the first humidity of the indoor environment and the outdoor humidity are detected by the indoor and outdoor humidity sensors respectively. A humidity difference value between the indoor humidity and the outdoor humidity is acquired by subtracting the outdoor humidity from the first humidity. It is determined whether the humidity difference value is greater than or equal to a preset humidity difference value. If the humidity difference value is greater than or equal to the preset humidity difference value, it indicates that the indoor humidity is high and much larger than the outdoor humidity, and thus the dehumidification mode needs to be turned on for dehumidification. If the humidity difference value is less than the preset humidity difference value, it indicates that the humidity difference value between the indoor humidity and the outdoor humidity is not large, and thus the dehumidification mode does not need to be turned on for dehumidification.

Therefore, the control method of the present disclosure can automatically control the dehumidification mode to be in an on-state so as to adjust the humidity of the indoor environment, and automatically control the dehumidification mode to be in an off-state so as to reduce the loss of energy efficiency.

Figure 5:
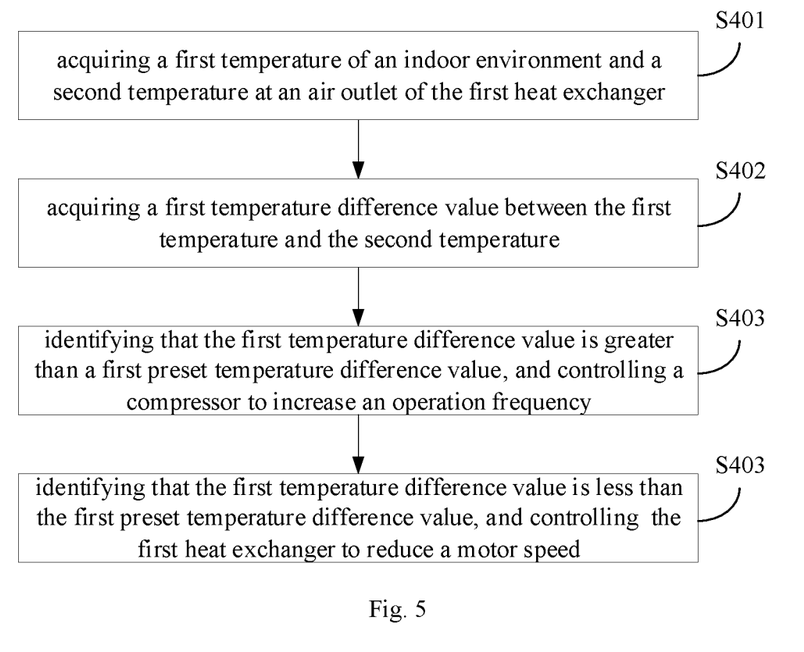
FIG. 5 is a flow chart of a control method for an air conditioning system according to another embodiment of the present disclosure.

A shown in FIG. 5, controlling the air conditioning system to operate according to an on-state of the fresh air mode includes:
- S401 acquiring a first temperature of an indoor environment and a second temperature at an air outlet of the first heat exchanger;
- S402 acquiring a first temperature difference value between the first temperature and the second temperature;
- S403 identifying that the first temperature difference value is greater than a first preset temperature difference value, and controlling a compressor to increase an operation frequency;
- S404 identifying that the first temperature difference value is less than the first preset temperature difference value, and controlling the first heat exchanger to reduce a motor speed.

Figure 6:
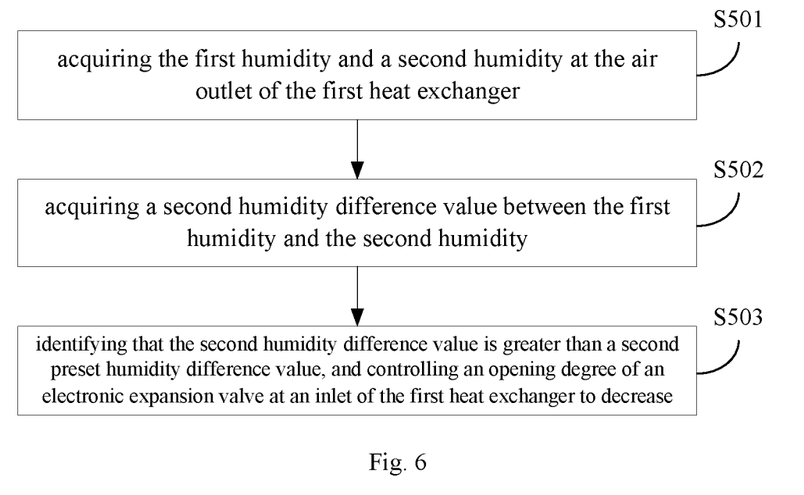
FIG. 6 is a flow chart of a control method for an air conditioning system according to still another embodiment of the present disclosure.

A shown in FIG. 6, in the case of identifying that the first temperature difference value is greater than the first preset temperature difference value and controlling the compressor to increase the operation frequency, the method further includes:
- S501 acquiring the first humidity and a second humidity at the air outlet of the first heat exchanger;
- S502 acquiring a second humidity difference value between the first humidity and the second humidity;
- S503 identifying that the second humidity difference value is greater than a second preset humidity difference value, and controlling an opening degree of an electronic expansion valve at an inlet of the first heat exchanger to decrease.

That is, when merely the fresh air mode is in the on-state, the first temperature of the indoor environment T1 and the second temperature of the first heat exchanger T2 are acquired respectively. A first temperature difference value Y1 is calculated by subtracting the first temperature T1 from the second temperature T2. The relationship between the first temperature difference value Y1 and a first preset temperature difference value is determined. If the first temperature difference value Y1 is less than the first preset temperature difference value, it determines that the second temperature at the air outlet of the first heat exchanger is lower than the first temperature of the indoor environment, and thus the motor speed for the dehumidification system is reduced to decrease the energy consumption. If the first temperature difference value Y1 is greater than the first preset temperature difference value, a compressor is controlled to increase an operation frequency, so as to increase the refrigeration efficiency and ensure that the indoor environment is cool. Meanwhile, the first humidity H1 and a second humidity at the air outlet of the first heat exchanger H2 are also acquired. A second humidity difference value X1 is calculated by subtracting the first humidity H1 from the second humidity H2. It is determined whether the second humidity difference value X1 is greater than a second preset humidity difference value. If the second humidity difference value X1 is greater than the second preset humidity difference value, it indicates that the humidity of the air blown from the first heat exchanger is greater than the humidity of the indoor environment, that is, the dehumidification amount is insufficient. Further, the temperature at the air outlet of the first heat exchanger is higher than the temperature of the indoor environment, and thus two strands of air mix and consume energy. Therefore, while increasing the operation efficiency of the compressor, the opening degree of the electronic expansion valve at the inlet of the first heat exchanger is reduced to decrease the refrigerant flow of the first heat exchanger and increases the dehumidification amount.

Therefore, the control method of the present disclosure can adjust the dehumidification amount in the dehumidification mode and indoor temperature by determining the humidity and temperature at the air outlet of the first heat exchanger and the humidity and temperature of the indoor environment, so as to save energy under the premise that the dehumidification amount is satisfied.

Figure 7:
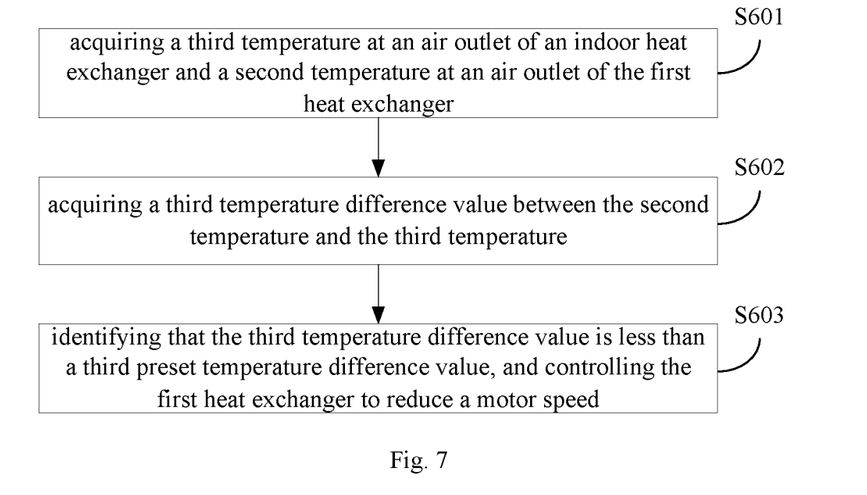
FIG. 7 is a flow chart of a control method for an air conditioning system according to still another embodiment of the present disclosure.

As shown in FIG. 7, controlling the air conditioning system to operate according to both the on-state of the fresh air mode and the on-state of the dehumidification mode includes:
- S601 acquiring a third temperature at an air outlet of an indoor heat exchanger and a second temperature at an air outlet of the first heat exchanger;
- S602 acquiring a third temperature difference value between the second temperature and the third temperature;
- S603 identifying that the third temperature difference value is less than a third preset temperature difference value, and controlling the first heat exchanger to reduce a motor speed.

Figure 8:
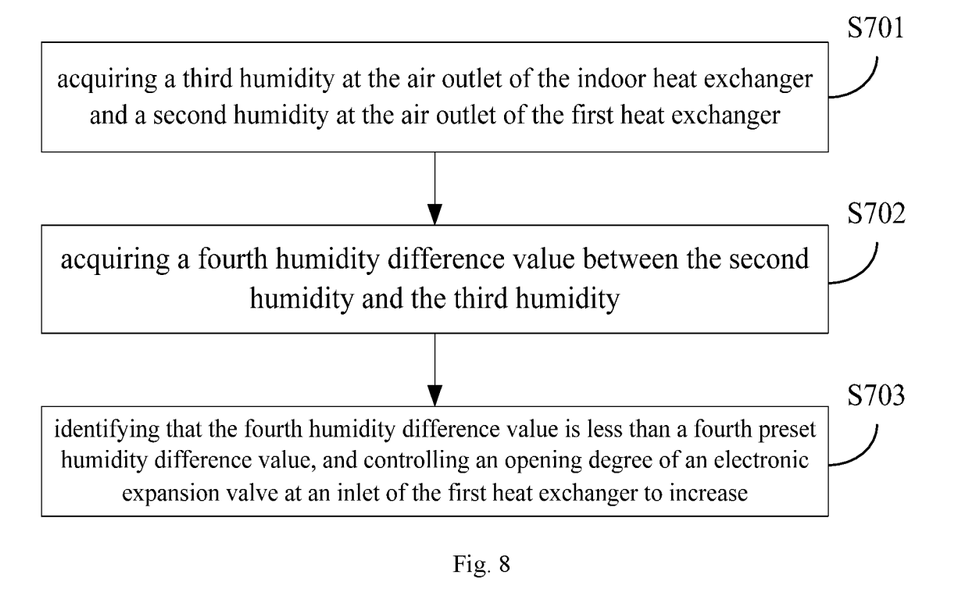
FIG. 8 is a flow chart of a control method for an air conditioning system according to still another embodiment of the present disclosure.

As shown in FIG. 8, in the case of controlling the first heat exchanger to reduce a motor speed, the method further includes:
- S701 acquiring a third humidity at the air outlet of the indoor heat exchanger and a second humidity at the air outlet of the first heat exchanger;
- S702 acquiring a fourth humidity difference value between the second humidity and the third humidity;
- S703 identifying that the fourth humidity difference value is less than a fourth preset humidity difference value, and controlling an opening degree of an electronic expansion valve at an inlet of the first heat exchanger to increase.

Figure 9:
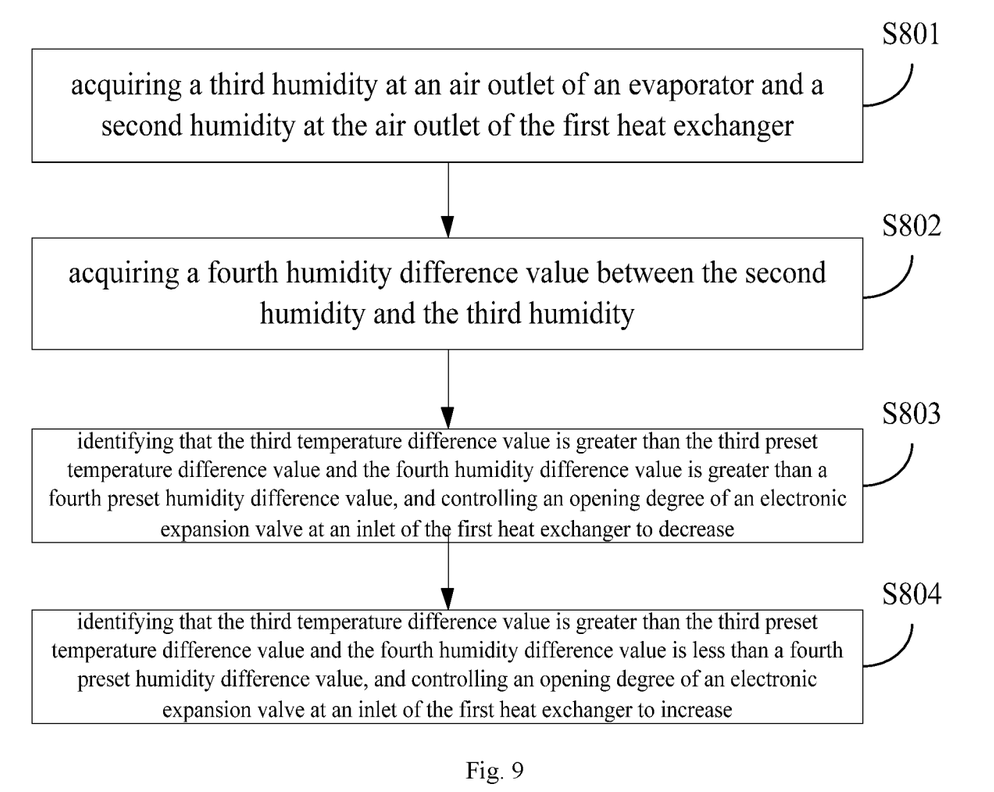
FIG. 9 is a flow chart of a control method for an air conditioning system according to still another embodiment of the present disclosure.

As shown in FIG. 9, the method further includes:
- S801 acquiring a third humidity at the air outlet of the indoor heat exchanger and a second humidity at the air outlet of the first heat exchanger;
- S802 acquiring a fourth humidity difference value between the second humidity and the third humidity;
- S803 identifying that the third temperature difference value is greater than the third preset temperature difference value and the fourth humidity difference value is greater than a fourth preset humidity difference value, and controlling an opening degree of an electronic expansion valve at an inlet of the first heat exchanger to decrease,
- S804 identifying that the third temperature difference value is greater than the third preset temperature difference value and the fourth humidity difference value is less than a fourth preset humidity difference value, and controlling an opening degree of an electronic expansion valve at an inlet of the first heat exchanger to increase.

It should be noted that when the air conditioning system operates according to both the on-state of the fresh air mode and the on-state of the dehumidification mode, it indicates that the whole air conditioning system is in the on-state. At this time, the third temperature T3 and the third humidity H3 at the air outlet of the indoor heat exchanger and the second temperature T2 and the second humidity H2 at the air outlet of the first heat exchanger are acquired respectively. The third temperature difference value Y2 is calculated by subtracting the third temperature T3 from the second temperature T2. The fourth humidity difference value X2 is calculated by subtracting the third humidity H3 from the second humidity H2.

If the fourth humidity difference value X2 is greater than the fourth preset humidity difference value and the third temperature difference value Y2 is greater than the third preset temperature difference value, it indicates that the humidity of the air at the air outlet of the first heat exchanger is greater than the humidity at the air outlet of the indoor heat exchanger, that is, insufficient dehumidification amount; and the temperature at the air outlet of the first heat exchanger is higher than the temperature at the air outlet of the indoor heat exchanger, and thus two strands of air mix and consume energy, thereby reducing the energy efficiency of the air conditioning system and increasing the temperature of the indoor air. Therefore, the opening degree of the electronic expansion valve at the inlet of the first heat exchanger is controlled to decrease, so as to reduce the refrigerant flow of the first heat exchanger and increase the dehumidification amount.

If the fourth humidity difference value X2 is greater than the fourth preset humidity difference value and the third temperature difference value Y2 is less than the third preset temperature difference value, it indicates that the dehumidification amount is insufficient, but the temperature at the air outlet of the first heat exchanger is lower than the temperature at the air outlet of the indoor heat exchanger, and thus it is needed to increase the dehumidification amount but not needed to increase the amount of injected fresh air. Therefore, the first heat exchanger is controlled to reduce its motor speed, so as to decrease the amount of injected fresh air but increase the dehumidification amount.

If the fourth humidity difference value X2 is less than the fourth preset humidity difference value and the third temperature difference value Y2 is greater than the third preset temperature difference value, it indicates that the dehumidification amount is satisfied at the time, but the temperature at the air outlet of the first heat exchanger is higher than the temperature at the air outlet of the indoor heat exchanger, and thus two strands of air mix and consume energy, thereby reducing the energy efficiency of the air conditioning system and increasing the temperature of the indoor air. Therefore, the opening degree of the electronic expansion valve at the inlet of the first heat exchanger is controlled to increase, so as to increase the refrigerant flow of the first heat exchanger, increase the refrigeration capacity of the indoor heat exchanger, and reduce the fresh air temperature.

If the fourth humidity difference value X2 is less than the fourth preset humidity difference value and the third temperature difference value Y2 is less than the third preset temperature difference value, it indicates that the dehumidification amount and the fresh air temperature are both satisfied. At this time, the first heat exchanger is controlled to reduce its motor speed and the opening degree of the electronic expansion valve at the inlet of the first heat exchanger is controlled to increase to save energy.

Based on the above, according to the control method for the air conditioning system in the embodiments of the present disclosure, while the fresh air mode and the dehumidification mode of the air conditioning system are automatically controlled, the humidity and the temperature of the fresh air can be balanced, so as to prevent the temperature from being too low during the dehumidification process, thereby avoiding adversely affecting the indoor temperature and causing uncomfortable feeling to user; or so as to avoid the situation where the temperature is increased but the dehumidification effect is not good, thereby improving the comfort level of user.

To implement the foregoing embodiments, the present disclosure in embodiments further proposes a control device of an air conditioning system.

Figure 10:
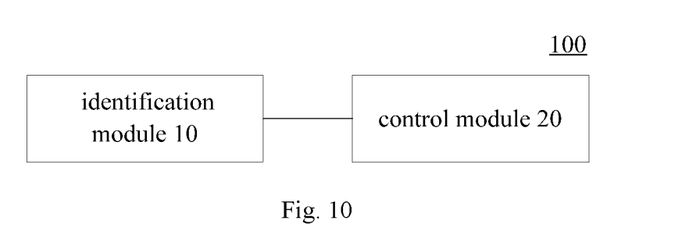
FIG. 10 is a schematic block diagram of a control device of an air conditioning system according to embodiments of the present disclosure.

FIG. 10 is a schematic block diagram of a control device of an air conditioning system according to an embodiment of the present disclosure. As shown in FIG. 10, the control device 100 of the air conditioning system includes an identification module 10 and a control module 20.

The identification module 10 is configured to:
acquire a gas concentration of indoor carbon dioxide,
determine an operation state of a fresh air mode according to the gas concentration,
acquire a first humidity of an indoor environment and an outdoor humidity, and
determine an operation state of a dehumidification mode according to the first humidity and the outdoor humidity.

The control module 20 is configured to:
control the air conditioning system to operate according to the operation state of the fresh air mode, and
control the air conditioning system to operate according to the operation state of the dehumidification mode.

It should be noted that, the foregoing description of the embodiments of the control method for the air conditioning system are also applicable to the control device of the air conditioning system in the embodiments, which will not be repeated herein.

Figure 11:
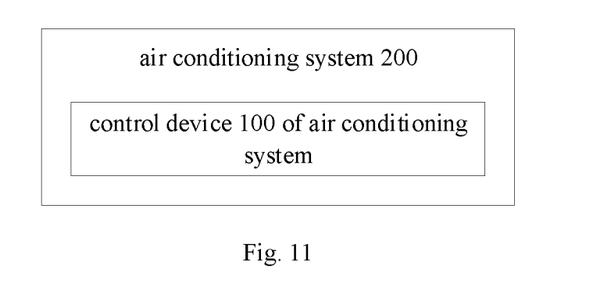
FIG. 11 is a schematic block diagram of an air conditioning system according to embodiments of the present disclosure.

To implement the foregoing embodiments, the present disclosure in embodiments further proposes an air conditioning system. As shown in FIG. 11, the air conditioning system 200 includes the control device 100.

To implement the foregoing embodiments, the present disclosure further provides a computer readable storage medium, having stored therein a computer program that, when executed by a processor, implements the control method for an air conditioning system described above.

In the description of this specification, reference to terms "an embodiment," "some embodiments," "one embodiment," "an example," "an illustrative example," "some examples" or the like means that a particular feature, structure, material or characteristic described in connection with the embodiment or example is included in at least one embodiment or example of the present disclosure. Thus, the illustrative representations of the terms are not necessarily directed to the same embodiment or example in this specification. Moreover, the specific features, structures, materials or characteristics as described can be combined in any one or more embodiments or examples in a suitable manner. In addition, those skilled persons in the art can combine different embodiments or examples or the features of the different embodiments or examples described in this specification without contradicting each other.

In addition, the terms "first" and "second" are only used for descriptive purposes and cannot be understood as indicating or implying relative importance or implicitly indicating the number of indicated technical features. Therefore, the features defined with "first" and "second" may explicitly or implicitly include at least one of the features. In the description of the present disclosure, unless specifically defined otherwise, "a plurality of" means at least two, such as two, three or the like.

The description to any process or method in the flow chart or described in other ways can be understood as a module, a segment or a part of codes of one or more executable instructions for implementing customized logic functions or steps of a process. The scope of the preferred embodiments of the present disclosure includes additional implementations, which may not be in the order shown or discussed, including implementing functions in a substantially simultaneous manner or in a reverse order according to the functions involved. This should be understood by those skilled in the art to which the embodiments of the present disclosure belong.

The logic and/or steps represented in the flow chart or described herein in other ways, for example, can be regarded as a sequence table of executable instructions for realizing logic functions, and can be implemented in any computer-readable medium, for use by an instruction execution system, equipment or device (such as a computer-based system, a system including a processor, or other systems that can fetch instructions from the instruction execution system, equipment or device and execute the instructions), or for use by a combination of the instruction execution system, equipment or device. In this specification, the "computer-readable medium" can be any device that can contain, store, communicate, propagate, or transmit a program for use by an instruction execution system, equipment or device or for use by a combination of the instruction execution system, equipment or device. More specific examples (non-exhaustive list) of the computer-readable medium include the following: an electrical connection (electronic device) with one or more wirings, a portable computer disk case (magnetic device), Random access memory (RAM), Read-only memory (ROM), erasable and editable read-only memory (EPROM or flash memory), a fiber optic device, and portable compact disk read-only memory (CDROM). In addition, the computer-readable medium may even be a paper or other suitable medium on which the program can be printed, because the program can be obtained electronically, for example, by optically scanning the paper or other medium, and then editing, interpreting, or other suitable processing ways if needed, which is then stored in the computer memory.

It should be understood that each part of the present disclosure can be implemented by hardware, software, firmware, or a combination thereof. In the above embodiments, multiple steps or methods can be implemented by software or firmware stored in a memory and executed by a suitable instruction execution system. For example, if it is implemented by hardware as in another embodiment, it can be implemented by any one or a combination of the following technologies known in the art: discrete logic circuits with a logic gate circuit realizing logic functions for data signals, specific integrated circuits with suitable combined logic gate circuits, programmable gate array (PGA), field programmable gate array (FPGA), or the like.

An ordinary skilled person in the art can understand that all or part of the steps carried in the method of the foregoing embodiments can be implemented by a program which instructs relevant hardware to implement. The program can be stored in a computer-readable storage medium. The program when executed performs one of the steps of the method embodiments or a combination thereof.

In addition, the functional units in the various embodiments of the present disclosure may be integrated into one processing module, or each unit may physically exist alone or two or more units may be integrated into one module. The integrated module mentioned as above can be implemented in the form of hardware or in the form of software functional module. If the integrated module is implemented in the form of a software function module and is sold or used as an independent product, it can also be stored in a computer readable storage medium.

The storage medium described above may be a read-only memory, a magnetic disk, an optical disk, or the like. Although the embodiments of the present disclosure have been shown and described above, it can be understood that the embodiments described above are exemplary and should not be construed as limiting the present disclosure. An ordinary skilled person in the art could make changes, modifications, substitutions, and modifications to the embodiments within the scope of the present disclosure.

What is claimed is:

1. A control method for an air conditioning system comprising:
    acquiring a gas concentration of indoor carbon dioxide;
    determining an operation state of a fresh air mode according to the gas concentration;
    acquiring an indoor humidity of an indoor environment and an outdoor humidity;
    determining an operation state of a dehumidification mode according to the indoor humidity and the outdoor humidity; and
    controlling the air conditioning system to operate according to at least one of the operation state of the fresh air mode or the operation state of the dehumidification mode, including:
        controlling the air conditioning system to operate according to an on-state of the fresh air mode, including:
            acquiring an indoor temperature of an indoor environment and an outlet temperature at an air outlet of a first heat exchanger of the air conditioning system, the first heat exchanger being connected in parallel to an indoor heat exchanger of the air conditioning system;
            acquiring a first temperature difference value between the indoor temperature and the outlet temperature; and
            controlling the air conditioning system to operate according to the first temperature difference value, including:
                in response to determining that the first temperature difference value is greater than a first preset temperature difference value, controlling a compressor of the air conditioning system to increase an operation frequency; or
                in response to determining that the first temperature difference value is less than the first preset temperature difference value, controlling the first heat exchanger to reduce a motor speed; or
        controlling the air conditioning system to operate according to both the on-state of the fresh air mode and an on-state of the dehumidification mode, including:
            acquiring an outlet temperature at an air outlet of the indoor heat exchanger of the air conditioning system and the outlet temperature at the air outlet of the first heat exchanger of the air conditioning system, the first heat exchanger being connected in parallel to the indoor heat exchanger;

acquiring a second temperature difference value between the outlet temperature at the air outlet of the indoor heat exchanger and the outlet temperature at the air outlet of the first heat exchanger; and in response to determining that the second temperature difference value is less than a second preset temperature difference value, controlling the first heat exchanger to reduce the motor speed.

2. The control method according to claim 1, wherein determining the operation state of the fresh air mode includes:

acquiring a concentration change rate of the gas concentration according to the gas concentration; and controlling the operation state of the fresh air mode according to the concentration change rate, including:

in response to determining that the concentration change rate is greater than a preset change rate, controlling the fresh air mode to be in the on-state; or in response to determining that the concentration change rate is less than or equal to the preset change rate and a change curve of the gas concentration is same as a preset change curve, controlling the fresh air mode to be in an off-state.

3. The control method according to claim 1, wherein determining the operation state of the dehumidification mode includes:

acquiring a humidity difference value between the indoor humidity and the outdoor humidity; and controlling the dehumidification mode according to the humidity difference value, including:

in response to determining that the humidity difference value is greater than or equal to a preset humidity difference value, controlling the dehumidification mode to be in the on-state; or in response to determining that the humidity difference value is less than the preset humidity difference value, controlling the dehumidification mode to be in an off-state.

4. The control method according to claim 1, wherein controlling the air conditioning system to operate further includes, in response to determining that the first temperature difference value is greater than the first preset temperature difference value, while controlling the compressor to increase the operation frequency:

acquiring an outlet humidity at the air outlet of the first heat exchanger;

acquiring a humidity difference value between the indoor humidity and the outlet humidity; and in response to determining that the humidity difference value is greater than a preset humidity difference value, controlling an opening degree of an electronic expansion valve at an inlet of the first heat exchanger to decrease.

5. The control method according to claim 1, wherein controlling the air conditioning system to operate further includes, while controlling the first heat exchanger to reduce the motor speed:

acquiring a first outlet humidity at the air outlet of the indoor heat exchanger and a second outlet humidity at the air outlet of the first heat exchanger;

acquiring a humidity difference value between the first outlet humidity and the second outlet humidity; and in response to determining that the humidity difference value is less than a preset humidity difference value, controlling an opening degree of an electronic expansion valve at an inlet of the first heat exchanger to increase.

6. The control method according to claim 1, further comprising:

acquiring a first outlet humidity at the air outlet of the indoor heat exchanger and a second outlet humidity at the air outlet of the first heat exchanger;

acquiring a humidity difference value between the first outlet humidity and the second outlet humidity; and controlling an opening degree of an electronic expansion valve at an inlet of the first heat exchanger according to the second temperature difference value and the humidity difference value, including:

in response to determining that the second temperature difference value is greater than the second preset temperature difference value and the humidity difference value is greater than a preset humidity difference value, controlling the opening degree to decrease; or in response to determining that the second temperature difference value is greater than the preset temperature difference value and the humidity difference value is less than the preset humidity difference value, controlling the opening degree to increase.

7. An air conditioning system comprising:
a first heat exchanger and an indoor heat exchanger connected to each other in parallel;
a compressor;
a processor; and
a memory storing a computer program that, when executed by the processor, causes the processor to:
acquire a gas concentration of indoor carbon dioxide;
determine an operation state of a fresh air mode according to the gas concentration;
acquire an indoor humidity of an indoor environment and an outdoor humidity;
determine an operation state of a dehumidification mode according to the indoor humidity and the outdoor humidity; and
control the air conditioning system to operate according to at least one of the operation state of the fresh air mode or the operation state of the dehumidification mode, including:
controlling the air conditioning system to operate according to an on-state of the fresh air mode, including:
acquiring an indoor temperature of an indoor environment and an outlet temperature at an air outlet of a first heat exchanger of the air conditioning system, the first heat exchanger being connected in parallel to an indoor heat exchanger of the air conditioning system;
acquiring a first temperature difference value between the indoor temperature and the outlet temperature; and
controlling the air conditioning system to operate according to the first temperature difference value, including:
in response to determining that the first temperature difference value is greater than a first preset temperature difference value, controlling a compressor of the air conditioning system to increase an operation frequency; or
in response to determining that the first temperature difference value is less than the first preset temperature difference value, controlling the first heat exchanger to reduce a motor speed; or controlling the air conditioning system to operate according to both the on-state of the fresh air mode and an on-state of the dehumidification mode, including:

acquiring an outlet temperature at an air outlet of the indoor heat exchanger of the air conditioning system and the outlet temperature at the air outlet of the first heat exchanger of the air conditioning system, the first heat exchanger being connected in parallel to the indoor heat exchanger;

acquiring a second temperature difference value between the outlet temperature at the air outlet of the indoor heat exchanger and the outlet temperature at the air outlet of the first heat exchanger; and in response to determining that the second temperature difference value is less than a second preset temperature difference value, controlling the first heat exchanger to reduce the motor speed.

8. The air conditioning system according to claim 7, wherein the computer program further causes the processor to:

acquire a concentration change rate of the gas concentration according to the gas concentration; and control the operation state of the fresh air mode according to the concentration change rate, including:

in response to determining that the concentration change rate is greater than a preset change rate, controlling the fresh air mode to be in the on-state; or in response to determining that the concentration change rate is less than or equal to the preset change rate and a change curve of the gas concentration is same as a preset change curve, controlling the fresh air mode to be in an off-state.

9. The air conditioning system according to claim 7, wherein the computer program further causes the processor to:

acquire a humidity difference value between the indoor humidity and the outdoor humidity; and control the dehumidification mode according to the humidity difference value, including:

in response to determining that the humidity difference value is greater than or equal to a preset humidity difference value, controlling the dehumidification mode to be in the on-state; or in response to determining that the humidity difference value is less than the preset humidity difference value, controlling the dehumidification mode to be in an off-state.

10. The air conditioning system according to claim 7, wherein the computer program further causes the processor to, in response to determining that the first temperature difference value is greater than the first preset temperature difference value, while controlling the compressor to increase the operation frequency:

acquire an outlet humidity at the air outlet of the first heat exchanger;

acquire a humidity difference value between the indoor humidity and the outlet humidity; and in response to determining that the humidity difference value is greater than a preset humidity difference value, control an opening degree of an electronic expansion valve at an inlet of the first heat exchanger to decrease.

11. The air conditioning system according to claim 7, wherein the computer program further causes the processor to, while controlling the first heat exchanger to reduce the motor speed:

acquire a first outlet humidity at the air outlet of the indoor heat exchanger and a second outlet humidity at the air outlet of the first heat exchanger;

acquire a humidity difference value between the first outlet humidity and the second outlet humidity; and in response to determining that the humidity difference value is less than a preset humidity difference value, control an opening degree of an electronic expansion valve at an inlet of the first heat exchanger to increase.

12. The air conditioning system according to claim 7, wherein the computer program further causes the processor to:

acquire a first outlet humidity at the air outlet of the indoor heat exchanger and a second outlet humidity at the air outlet of the first heat exchanger;

acquire a humidity difference value between the first outlet humidity and the second outlet humidity; and control an opening degree of an electronic expansion valve at an inlet of the first heat exchanger according to the second temperature difference value and the humidity difference value, including:

in response to determining that the second temperature difference value is greater than the second preset temperature difference value and the humidity difference value is greater than a preset humidity difference value, controlling the opening degree to decrease; or in response to determining that the second temperature difference value is greater than the second preset temperature difference value and the humidity difference value is less than the preset humidity difference value, controlling the opening degree to increase.

13. A non-transitory computer readable storage medium storing a computer program that, when executed by a processor, causes the processor to:

acquire a gas concentration of indoor carbon dioxide;

determine an operation state of a fresh air mode according to the gas concentration;

acquire an indoor humidity of an indoor environment and an outdoor humidity;

determine an operation state of a dehumidification mode according to the indoor humidity and the outdoor humidity; and control an air conditioning system to operate according to at least one of the operation state of the fresh air mode or the operation state of the dehumidification mode;

wherein:

the air conditioning system includes:

a first heat exchanger and an indoor heat exchanger connected to each other in parallel; and a compressor; and the computer program further causes the processor to control the air conditioning system to:

operate according to an on-state of the fresh air mode, including:

acquiring an indoor temperature of an indoor environment and an outlet temperature at an air outlet of the first heat exchanger;

acquiring a first temperature difference value between the indoor temperature and the outlet temperature at the outlet of the first heat exchanger; and controlling the air conditioning system to operate according to the first temperature difference value, including:

in response to determining that the first temperature difference value is greater than a first preset temperature difference value, controlling the compressor to increase an operation frequency; or in response to determining that the first temperature difference value is less than the first preset temperature difference value, controlling the first heat exchanger to reduce a motor speed; or operate according to both the on-state of the fresh air mode and an on-state of the dehumidification mode, including:

acquiring an outlet temperature at an air outlet of the indoor heat exchanger and the outlet temperature at the air outlet of the first heat exchanger;

acquiring a second temperature difference value between the outlet temperature at the air outlet of the indoor heat exchanger and the outlet temperature at the air outlet of the first heat exchanger; and in response to determining that the second temperature difference value is less than a second preset temperature difference value, controlling the first heat exchanger to reduce the motor speed.

14. The non-transitory computer readable storage medium according to claim 13, wherein the computer program further causes the processor to:

acquire a concentration change rate of the gas concentration according to the gas concentration; and control the operation state of the fresh air mode according to the concentration change rate, including:

in response to determining that the concentration change rate is greater than a preset change rate, controlling the fresh air mode to be in the on-state; or in response to determining that the concentration change rate is less than or equal to the preset change rate and a change curve of the gas concentration is same as a preset change curve, controlling the fresh air mode to be in an off-state.

15. The non-transitory computer readable storage medium according to claim 13, wherein the computer program further causes the processor to:

acquire a humidity difference value between the indoor humidity and the outdoor humidity; and control the dehumidification mode according to the humidity difference value, including:

in response to determining that the humidity difference value is greater than or equal to a preset humidity difference value, controlling the dehumidification mode to be in the on-state; or in response to determining that the humidity difference value is less than the preset humidity difference value, controlling the dehumidification mode to be in an off-state.

\* \* \* \* \*